US012058454B2

(12) United States Patent
Seo et al.

(10) Patent No.: US 12,058,454 B2
(45) Date of Patent: Aug. 6, 2024

(54) VISION SENSOR, IMAGE PROCESSING DEVICE INCLUDING THE SAME, AND OPERATING METHOD OF THE VISION SENSOR

(71) Applicant: SAMSUNG ELECTRONICS CO., LTD., Suwon-si (KR)

(72) Inventors: Jongseok Seo, Seoul (KR); Junhyuk Park, Seoul (KR); Hyunku Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/120,251

(22) Filed: Mar. 10, 2023

(65) Prior Publication Data

US 2023/0217123 A1 Jul. 6, 2023

Related U.S. Application Data

(63) Continuation of application No. 17/515,755, filed on Nov. 1, 2021.

(30) Foreign Application Priority Data

Dec. 1, 2020 (KR) .......................... 10-2020-0165943

(51) Int. Cl.
*H04N 25/47* (2023.01)
*G06T 7/215* (2017.01)
*H04N 23/80* (2023.01)
*H04N 25/443* (2023.01)
*H04N 25/46* (2023.01)

(52) U.S. Cl.
CPC ............. *H04N 25/47* (2023.01); *G06T 7/215* (2017.01); *H04N 23/80* (2023.01); *H04N 25/443* (2023.01); *H04N 25/46* (2023.01); *G06T 2207/20112* (2013.01)

(58) Field of Classification Search
CPC ............................... H04N 25/40; H04N 25/47
See application file for complete search history.

(56) References Cited

U.S. PATENT DOCUMENTS

| 8,965,048 | B2 | 2/2015 | Costa |
| 9,921,643 | B2 | 3/2018 | Lee et al. |
| 10,083,349 | B2 | 9/2018 | Park et al. |

(Continued)

FOREIGN PATENT DOCUMENTS

EP 4060983 A1 * 9/2022

*Primary Examiner* — Paul M Berardesca
(74) *Attorney, Agent, or Firm* — Sughrue Mion, PLLC

(57) ABSTRACT

Provided is a vision sensor including a pixel array including a plurality of pixels disposed in a matrix form, an event detection circuit configured to detect whether an event has occurred in the plurality of pixels and generate event signals corresponding to pixels from among the plurality of pixels in which an event has occurred, a map data processor configured to generate a timestamp map based on the event signals, and an interface circuit configured to transmit vision sensor data including at least one of the event signals and the timestamp map to an external processor, wherein the timestamp map includes timestamp information indicating polarity information, address information, and an event occurrence time of a pixel included in an event signal corresponding to the pixel.

20 Claims, 15 Drawing Sheets

(56) References Cited

U.S. PATENT DOCUMENTS

| | | |
|---|---|---|
| 10,097,779 B2 | 10/2018 | Park |
| 10,567,679 B2 | 2/2020 | Berner et al. |
| 2013/0335595 A1* | 12/2013 | Lee .................. H04N 23/80 |
| | | 348/231.5 |
| 2016/0078321 A1 | 3/2016 | Wang |
| 2017/0213105 A1 | 7/2017 | Ji |
| 2018/0295298 A1 | 10/2018 | Zamir |
| 2018/0353836 A1 | 12/2018 | Li et al. |
| 2019/0043583 A1 | 2/2019 | Majumder |
| 2019/0289230 A1 | 9/2019 | Berner |
| 2019/0356849 A1 | 11/2019 | Sapienza |
| 2020/0111220 A1 | 4/2020 | Delbruck et al. |
| 2020/0260022 A1 | 8/2020 | Movshovich |
| 2021/0152757 A1 | 5/2021 | Wakabayashi |
| 2022/0030185 A1 | 1/2022 | Honda |

* cited by examiner

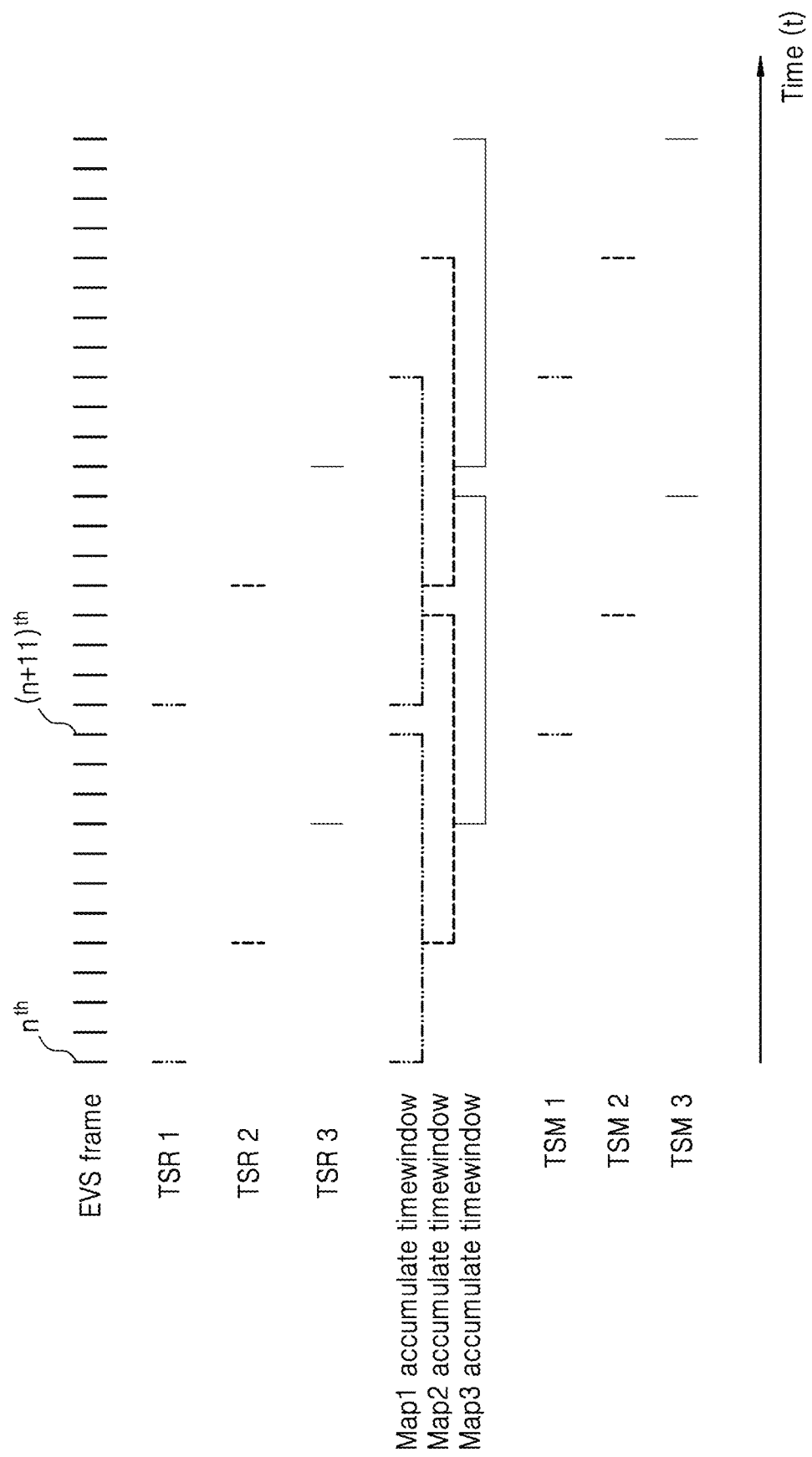

VISION SENSOR, IMAGE PROCESSING DEVICE INCLUDING THE SAME, AND OPERATING METHOD OF THE VISION SENSOR

CROSS-REFERENCE TO THE RELATED APPLICATION

This application is a continuation of U.S. application Ser. No. 17/515,755, filed Nov. 1, 2021, which is based on and claims priority to Korean Patent Application No. 10-2020-0165943, filed on Dec. 1, 2020, in the Korean Intellectual Property Office, the disclosure of which is incorporated by reference herein in its entirety.

BACKGROUND

1. Field

Example embodiments of the present disclosure relate to a vision sensor, and more particularly, to a vision sensor capable of generating and transmitting a timestamp map, an image processing device including the vision sensor, and an operating method of the vision sensor.

2. Background of Related Art

A vision sensor, for example, a dynamic vision sensor, generates, upon occurrence of an event, for example, a variation in an intensity of light, information about the event, that is, an event signal, and transmits the event signal to a processor.

A dynamic vision sensor according to related art transmits only event data and a timestamp, and data processing such as writing a timestamp map by using the data is mainly performed using a processor located outside the dynamic vision sensor. An operation of writing a timestamp map by using raw data consumes resources of a host, and thus, a method of reducing the burden of the host needs to be researched.

SUMMARY

One or more example embodiments provide a vision sensor generating a timestamp map and an optical flow map based on event data and a timestamp, an image processing device including the vision sensor, and an operating method of the vision sensor.

According to an aspect of an example embodiment, there is provided a vision sensor including a pixel array including a plurality of pixels disposed in a matrix form, an event detection circuit configured to detect whether an event has occurred in the plurality of pixels and generate event signals corresponding to pixels from among the plurality of pixels in which an event has occurred, a map data processor configured to generate a timestamp map based on the event signals, and an interface circuit configured to transmit vision sensor data including at least one of the event signals and the timestamp map to an external processor, wherein the timestamp map includes timestamp information indicating polarity information, address information, and an event occurrence time of a pixel included in an event signal corresponding to the pixel.

According to another aspect of an example embodiment, there is provided an image processing device including a vision sensor configured to generate a plurality of event signals corresponding to a plurality of pixels in which an event has occurred based on a movement of an object, from among the plurality of pixels included in a pixel array, generate a timestamp map based on polarity information, address information, and event occurrence time information of a pixel included in the plurality of event signals, and output vision sensor data including the event signals and the timestamp map, and a processor configured to detect the movement of the object by processing the vision sensor data output from the vision sensor.

According to an aspect of an example embodiment, there is provided an operating method of a vision sensor, the operating method including detecting whether an event has occurred in a plurality of pixels and generating event signals corresponding to pixels from among the plurality of pixels in which an event has occurred, generating vision sensor data including a timestamp map based on the event signals, and transmitting the vision sensor data to an external processor, wherein the timestamp map includes timestamp information indicating polarity information, address information, and an event occurrence time of a pixel included in an event signal.

BRIEF DESCRIPTION OF THE DRAWINGS

The above and/or other aspects, features, and advantages of example embodiments will be more clearly understood from the following detailed description, taken in conjunction with the accompanying drawings, in which:

FIG. 9 is a diagram for describing a method of generating a plurality of timestamp maps by using a vision sensor according to an example embodiment;

DETAILED DESCRIPTION

Hereinafter, various example embodiments will be described with reference to the attached drawings.

Figure 1:
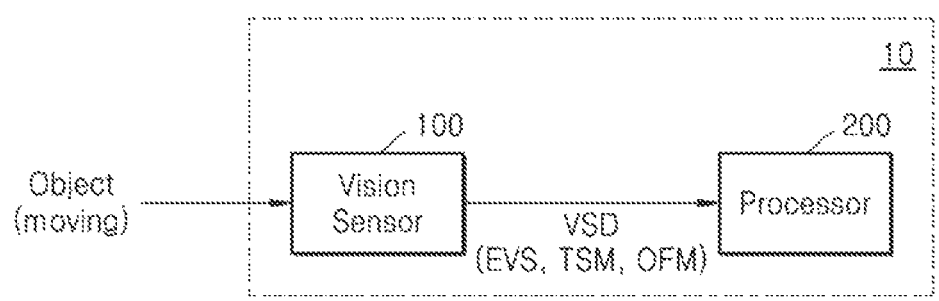
FIG. 1 is a block diagram illustrating an image processing device according to an example embodiment.

FIG. 1 is a block diagram illustrating an image processing device according to an example embodiment.

An image processing device 10 according to an example embodiment may be mounted in an electronic device having an image or light sensing function. For example, the image processing device 10 may be mounted in an electronic device such as a camera, a smartphone, a wearable device, Internet of Things (IoT), a tablet personal computer (PC), a personal digital assistant (PDA), a portable multimedia player (PMP), a navigation device, a drone, an advanced driver-assistance system (ADAS), or the like. Also, the image processing device 10 may be included as a component of a vehicle, furniture, manufacturing equipment, a door, various measuring instruments, or the like.

Referring to FIG. 1, the image processing device 10 may include a vision sensor 100 and a processor 200. The vision sensor 100 detects a variation in an intensity of incident light and transmits vision sensor data VSD including at least one of an event signal EVS, a timestamp map TSM, and an optical flow map OFM, to the processor 200.

The vision sensor 100 may detect a variation in an intensity of incident light and output an event signal. The vision sensor 100 may be a dynamic vision sensor outputting event signals EVS with respect to pixels, in which a variation in a light intensity is detected, for example, pixels in which an event has occurred. The variation in the intensity of light may be due to a movement of an object, of which an image is captured using the vision sensor 100, or due to a movement of the vision sensor 100 or the image processing device 10. The vision sensor 100 may transmit event signals EVS to the processor 200 periodically or non-periodically. The vision sensor 100 may transmit, to the processor 200, not only the event signals EVS including an address, a polarity, and a timestamp but also a timestamp map TSM or an optical flow map OFM generated based on the event signal EVS.

The vision sensor 100 may selectively transmit the event signals EVS to the processor 200. The vision sensor 100 may transmit, to the processor 200, those event signals EVS generated from pixels PX corresponding to a region of interest (ROI) set in a pixel array 110 from among event signals generated to correspond to the pixel array 110.

According to an example embodiment, the vision sensor 100 may apply crop or event binning to the event signals EVS. Also, the vision sensor 100 may generate a timestamp map TSM or an optical flow map OFM based on an event signal EVS. According to an example embodiment, the vision sensor 100 may selectively transmit event signals EVS, a timestamp map TSM, or an optical flow map OFM to the outside according to a transmission mode.

The processor 200 may process the event signal EVS received from the vision sensor 100, and detect a movement of an object or a movement of an object on an image recognized by the image processing device 10, and may use an algorithm such as a simultaneous localization and mapping (SLAM). The processor 200 may include an application specific integrated circuit (ASIC), a field-programmable gate array (FPGA), a dedicated microprocessor, a microprocessor, a general purpose processor, or the like. According to an example embodiment, the processor 200 may include an application processor or an image processor.

In addition, the vision sensor 100 and the processor 200 may be each implemented as an integrated circuit (IC). For example, the vision sensor 100 and the processor 200 may be implemented as separate semiconductor chips, or may be implemented as single chips. For example, the vision sensor 100 and the processor 200 may be implemented as system on chips (SoCs).

Figure 2:
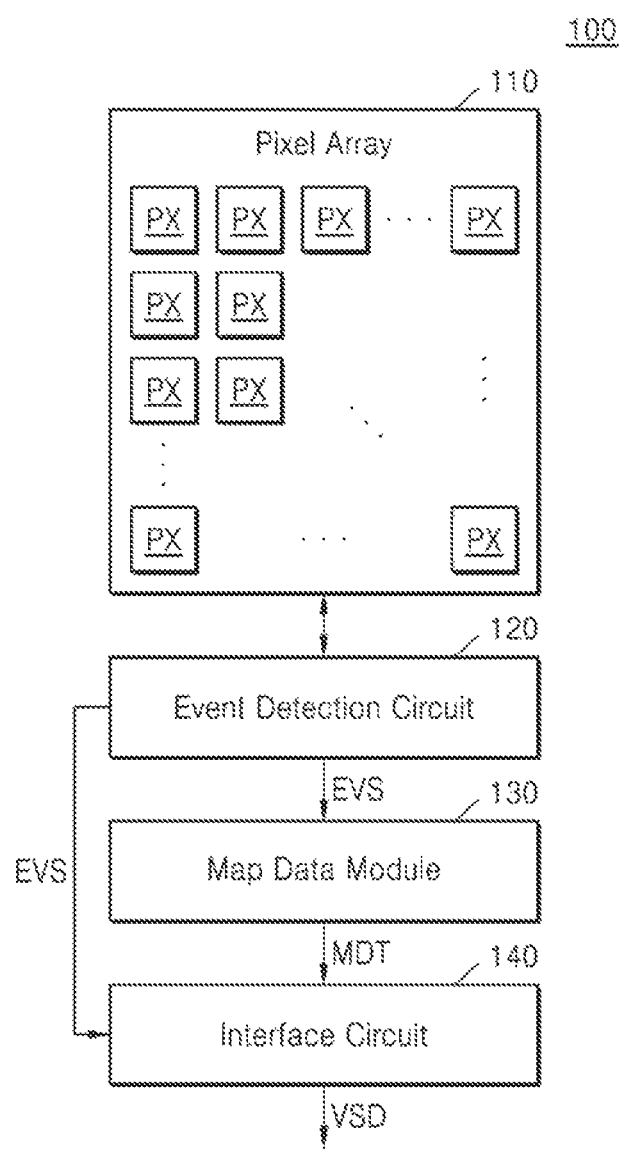
FIG. 2 is a block diagram illustrating a vision sensor according to an example embodiment.

FIG. 2 is a block diagram illustrating a vision sensor according to an example embodiment.

Referring to FIG. 2, the vision sensor 100 may include the pixel array 110, an event detection circuit 120, a map data module 130, and an interface circuit 140.

The pixel array 110 may include a plurality of pixels PX arranged in a matrix form. Each of the pixels PX may detect events such as an increase or a decrease in an intensity of received light. For example, each of the pixels PX may be connected to the event detection circuit 120 via column lines extending in a column direction and row lines extending in a row direction. A signal indicating that an event has occurred and polarity information of an event, for example, whether the event is an on-event where a light intensity increases or an off-event where a light intensity decreases, may be output from a pixel PX in which the event has occurred, to the event detection circuit 120.

The event detection circuit 120 may read events from the pixel array 110 and process the events. The event detection circuit 120 may generate an event signal EVS including polarity information of the occurred event, an address of a pixel in which the event has occurred, and a timestamp. The event signal EVS may be generated in various formats, for example, in an address event representation (AER) format including address information, timestamp information, and polarity information of a pixel in which an event has occurred or a raw format including event occurrence information of all pixels.

The event detection circuit 120 may process events that occurred in the pixel array 110, in units of pixels, in units of pixel groups including a plurality of pixels, in units of columns or in units of frames.

The map data module 130 may adjust an amount of the event signals EVS by post-processing such as crop, which refers to setting of an ROI in a pixel array with respect to an event signal EVS or event binning for setting a data amount, and adjust a size of a timestamp map TSM and an optical flow map OFM that are generated. According to an example embodiment, the map data module 130 may generate map data MDT including a timestamp map or an optical flow map and output the map data MDT to the interface circuit 140, or output the event signals EVS received from the event detection circuit 120 to the interface circuit 140.

The interface circuit 140 may receive the event signals EVS and pieces of map data MDT, and transmit vision sensor data VSD to the processor 200 (FIG. 1) according to a set protocol. The interface circuit 140 may pack the event signals EVS and the pieces of the map data MDT into individual signal units, packet units, or frame units, according to a set protocol to generate vision sensor data VSD, and transmit the vision sensor data VSD to the processor 200. For example, the interface circuit 140 may include a mobile industry processor interface (MIPI).

Hereinafter, the event signals EVS or pieces of map data MDT being output may be the event signals EVS or the pieces of map data MDT being converted into vision sensor data VSD via the interface circuit 140 and the vision sensor data VSD being transmitted to the processor 200.

Figure 3:
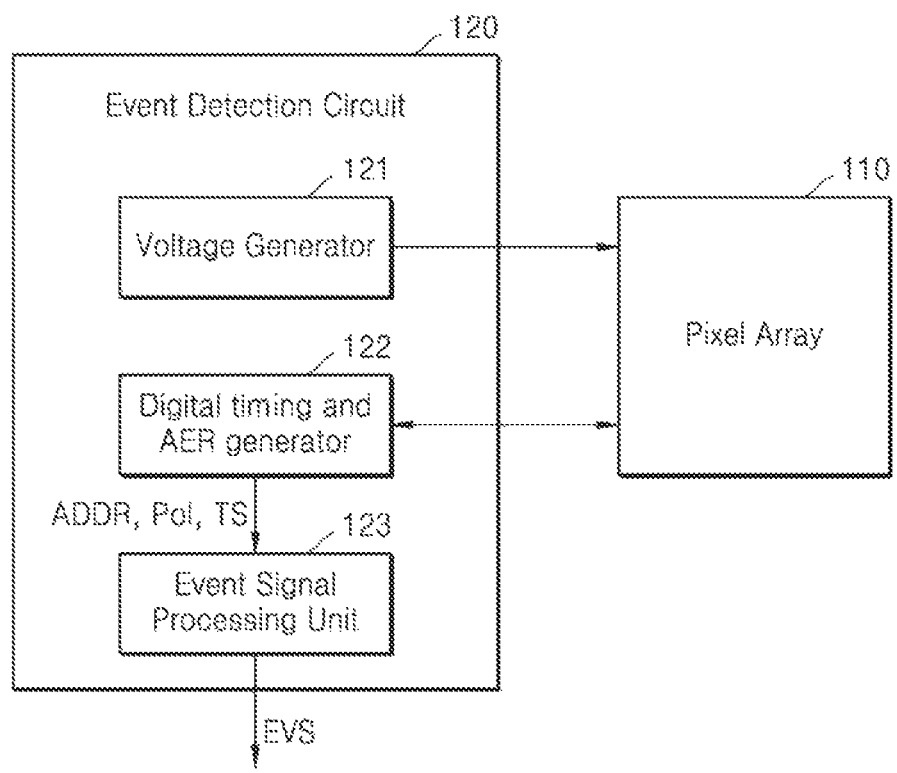
FIG. 3 is a block diagram illustrating an event detection circuit according to an example embodiment.

FIG. 3 is a block diagram illustrating an event detection circuit according to an example embodiment.

Referring to FIG. 3, the event detection circuit 120 may include a voltage generator 121, a digital timing/AER generator (DTAG) 122, and an event signal processing (ESP)

unit 123. The DTAG 122 may include a column AER generator and a row AER generator.

The voltage generator 121 may generate a voltage provided to the pixel array 110. For example, the voltage generator 121 may generate threshold voltages used to detect an on-event or an off-event from the pixel PX (FIG. 2) or bias voltages. The voltage generator 121 may change a voltage level of threshold voltages provided to pixels of an ROI, and may differently change voltage levels of the threshold voltages with respect to a plurality of ROIs.

The DTAG 122 may receive, from the pixel PX in which an event has occurred, a signal indicating that the event has occurred, and generate a timestamp TS including information about a time when the event of the pixel PX has occurred, and an address ADDR including a column address, a row address, or a group address.

For example, the column AER generator may receive, from the pixel PX in which an event has occurred, a signal indicating that the event has occurred, for example, a column request, and generate a column address C_ADDR of the pixel PX in which the event has occurred.

The row AER generator may receive, from the pixel PX in which an event has occurred, a signal indicating that the event has occurred, for example, a row request, and generate a row address R_ADDR of the pixel PX in which the event has occurred. Instead of the row AER generator generating a row address, a group address G_ADDR may also be generated in units of preset groups.

According to an example embodiment, the pixel array 110 may be scanned in units of columns, and when a request is received from a certain column, for example, a first column, the column AER generator may transmit a response signal to the first column. The pixel PX in which the event has occurred and which has received the response signal may transmit polarity information Pol, for example, a signal indicating the occurrence of an on-event or an off-event, to the row AER generator. Upon receiving the polarity information Pol, the row AER generator may transmit a reset signal to the pixel PX in which the event has occurred. In response to the reset signal, the pixel PX in which the event has occurred may be reset. The row AER generator may control a period at which a reset signal is generated. The row AER generator may generate information about a time when an event has occurred, that is, a timestamp TS.

Operations of the row AER generator and the column AER generator are described above by assuming that the pixel array 110 is scanned in units of columns. However, the operations of the row AER generator and the column AER generator are not limited thereto, and the row AER generator and the column AER generator may read, from the pixel PX in which an event has occurred, whether the event has occurred and polarity information Pol, in various manners. For example, the pixel array 110 may be scanned in units of rows, and operations of the row AER generator and the column AER generator may be exchanged with each other, that is, the column AER generator may receive a polarity information Pol and transmit a reset signal to the pixel array 110. Also, the row AER generator and the column AER generator may individually access the pixel PX in which the event has occurred.

The ESP unit 123 may generate an event signal EVS based on a column address C_ADDR, a row address R_ADDR, a group address G_ADDR, a polarity information Pol, and a timestamp TS received from the DTAG 122. According to an example embodiment, the ESP unit 123 may remove a noise event, and generate an event signal EVS with respect to valid events. For example, when an amount of events that occurred for a certain period of time is less than a threshold, the ESP unit 123 may determine the events as noise, and may not generate an event signal EVS with respect to the noise event.

Figure 4A:
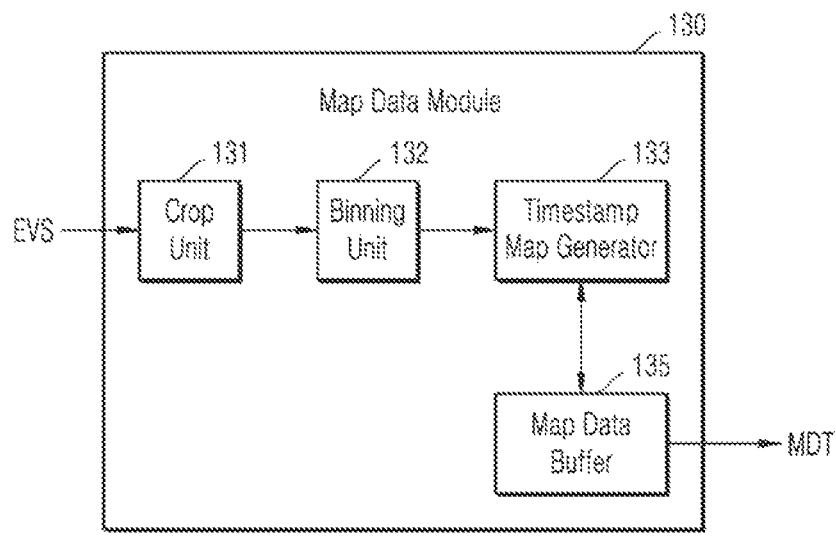
FIGS. 4A and 4B are block diagrams illustrating a map data module according to an example embodiment.
Figure 4B:
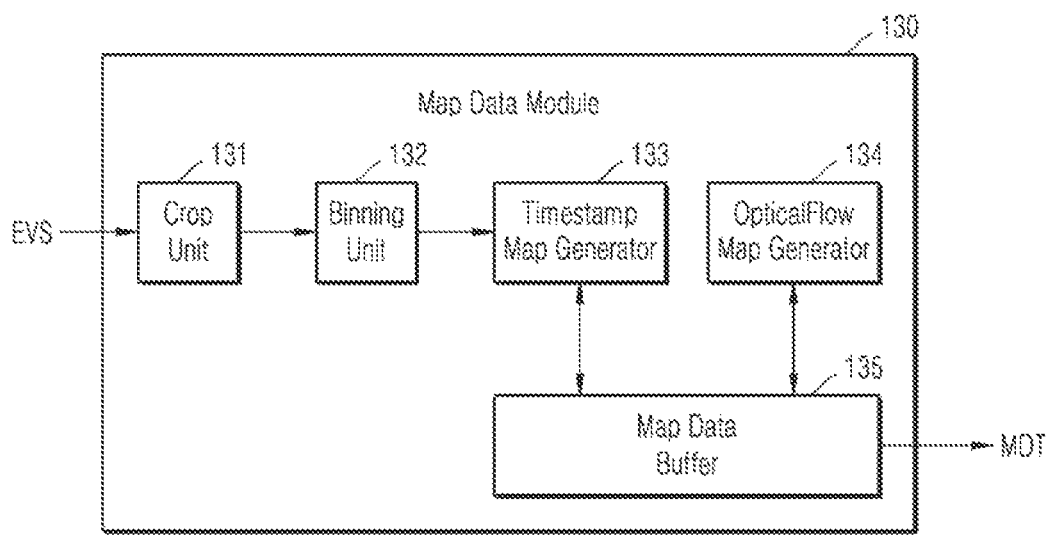

FIGS. 4A and 4B are block diagrams illustrating a map data module according to an example embodiment.

Referring to FIG. 4A, the map data module 130 may include a crop unit 131, a binning unit 132, a timestamp map generator 133, and a map data buffer 135.

The crop unit 131 may set at least one ROI on a pixel array including a plurality of pixels, according to a user's settings or a preset algorithm. For example, the crop unit 131 may set a region in which multiple events occur, as an ROI, from among a plurality of regions set with respect to the pixel array 110, or set an arbitrary region corresponding to pixels in which multiple events occur during a certain period of time, as an ROI. According to another example embodiment, an arbitrary region that is set by a user arbitrarily or corresponds to pixels PX from which a certain object is sensed may be set as an ROI. However, the ROI is not limited thereto and may be set in various manners.

The binning unit 132 may adjust a data amount used in generating a map according to a user's settings or a preset algorithm. For example, the binning unit 132 may perform a binning operation on an ROI by grouping pixels included in a set ROI, in certain units.

The timestamp map generator 133 may generate a timestamp map TSM based on an event signal EVS adjusted using the crop unit 131 and the binning unit 132. For example, the timestamp map generator 133 may generate a timestamp map TSM only with respect to an ROI that is designated by cropping. Also, the timestamp map generator 133 may generate a timestamp map TSM having a size adjusted by binning.

The map data buffer 135 may store the timestamp map TSM generated using the timestamp map generator 133, and transmit the stored timestamp map TSM to the interface circuit 140 in the vision sensor 100 as map data MDT.

Referring to FIG. 4B, the map data module 130 may include the crop unit 131, the binning unit 132, the timestamp map generator 133, an optical flow map generator 134, and the map data buffer 135. The optical flow map generator 134 may generate an optical flow map OFM based on the timestamp map TSM stored in the map data buffer 135. The optical flow map OFM may be stored in the map data buffer 135 in which the timestamp map TSM is stored.

An optical flow may be a pattern of apparent motion of objects, surfaces, and edges in a visual scene caused by the relative motion between an observer and a scene, and may be a distribution of apparent velocities of movement of a brightness pattern in an image. According to example embodiments, an optical flow may be information about a direction and velocity in and at which a pixel in which an event signal is generated is varied.

Figure 5:
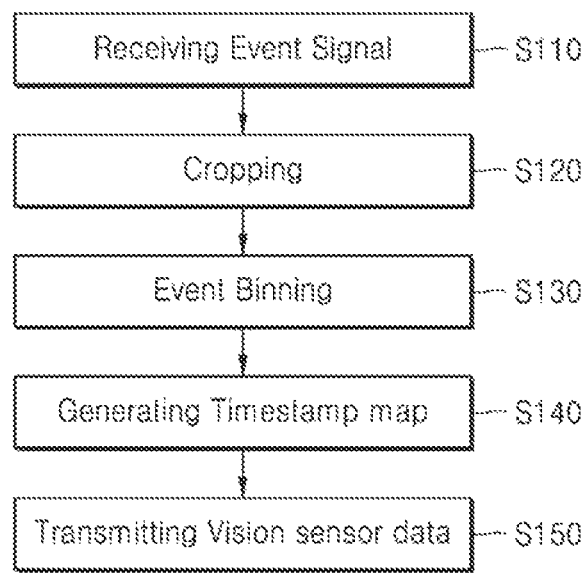
FIG. 5 is a flowchart of an operating method of a vision sensor according to an example embodiment.

FIG. 5 is a flowchart of an operating method of a vision sensor according to an example embodiment.

Referring to FIGS. 2 and 5, the event detection circuit 120 may detect whether an event has occurred in each of a plurality of pixels, and generate event signals EVS corresponding to pixels in which an event has occurred. The event detection circuit 120 may generate event signals EVS in an AER format including address information, timestamp information, and polarity information of a pixel in which an event has occurred or in a raw format including event occurrence information of all pixels.

The map data module 130 may receive the event signals EVS from the event detection circuit 120 (S110).

The map data module 130 may perform crop of selecting event signals generated in an ROI of a pixel array, from among event signals, according to a user's settings or a preset algorithm (S120).

The map data module 130 may perform event binning (S130). When the number of events that occurred in a preset N*N size-pixel is greater than a preset threshold value, the map data module 130 may determine that an event has occurred, and store an event signal EVS on an array for storing a timestamp map corresponding to the N*N size-pixel.

The map data module 130 may generate a timestamp map TSM (S140). The map data module 130 may generate a plurality of timestamp maps TSM having different reference frames from each other in an event signal frame period that is periodically generated.

For example, the map data module 130 may periodically generate a first timestamp reference and a first timestamp map based on a preset number of event signal frames counted from the first timestamp reference, and periodically generate a second timestamp reference and a second timestamp map based on a preset number of event signal frames counted from the second timestamp reference. For example, the first timestamp map may be generated by setting a first timestamp reference frame as a first event signal frame and accumulating up to an eleventh event signal frame, and the second timestamp map may be generated by setting a second timestamp reference frame as a fifth event signal frame and accumulating from the fifth event signal frame up to a fifteenth event signal frame. Three or more timestamp maps TSM may also be generated according to the occurrence of an event signal EVS or user's settings.

The map data module 130 may store an offset value of a timestamp based on a preset timestamp reference of a timestamp map TSM, and set a timestamp reference of the timestamp map TSM based on event occurrence information. When transmitting the timestamp map TSM to another device later, the map data module 130 may transmit raw data by adding, a timestamp reference value corresponding to the timestamp map TSM. For example, when an event generation time is r+k, a timestamp reference may be set as r, and an offset value of a timestamp may be stored as k. When transmitting the timestamp map to another device after the timestamp map is generated, a r+k value obtained by adding the timestamp reference r to the offset value k may be transmitted.

The map data module 130 may generate an optical flow map OFM by estimating, from the timestamp map TSM according to a preset algorithm, an optical flow including information about a direction and velocity in and at which a pixel in which an event signal is generated is varied. The map data module 130 may store the optical flow map OFM in a location of the map data buffer 135 in which the timestamp map TSM is stored, instead of the timestamp map TSM. Accordingly, a map data buffer size may be more effectively controlled.

The interface circuit 140 may transmit vision sensor data VSD including the event signal EVS, the timestamp map TSM, or the optical flow map OFM, to an external processor (S150). The interface circuit 140 may selectively transmit each piece of data according to an output mode.

For example, in a first output mode, the interface circuit 140 may output only an event signal included in the vision sensor data VSD to an external processor. In a second output mode, the interface circuit 140 may generate at least one virtual channel and transmit an event signal to an external processor via a first virtual channel, and transmit timestamp map data to an external processor via a second virtual channel. In a third output mode, the interface circuit 140 may generate at least one virtual channel, and transmit an event signal to an external processor via the first virtual channel, and transmit optical flow map data to the external processor via the second virtual channel.

Figure 6:
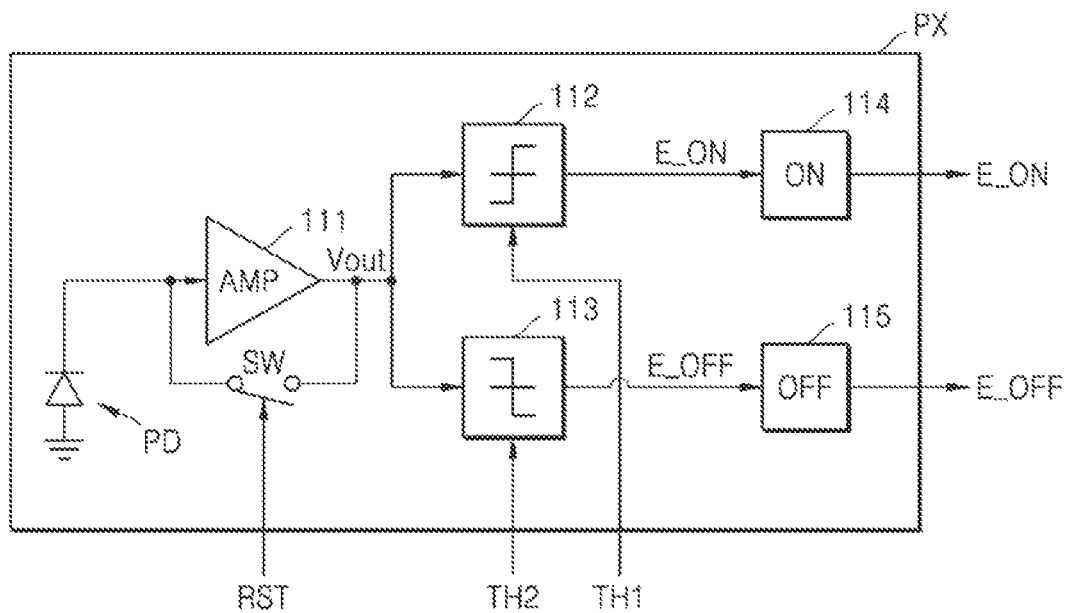
FIG. 6 is a circuit diagram illustrating an implementation example of a pixel.

FIG. 6 is a circuit diagram illustrating an implementation example of a pixel.

Referring to FIG. 6, a pixel PX may include a photoelectric conversion device PD, an amplifier 111, a first comparator 112, a second comparator 113, an on-event holder 114, an off-event holder 115, and a reset switch SW. The pixel PX may further include a capacitor for removing noise generated in the pixel PX or coming from the outside or various switches.

The photoelectric conversion device PD may convert incident light, that is, an optical signal, into an electrical signal, for example, an electric current. The photoelectric conversion device PD may include, for example, a photodiode, a phototransistor, a port gate or a pinned photodiode, or the like. The photoelectric conversion device PD may generate an electrical signal having a higher level as an intensity of incident light increases.

The amplifier 111 may convert a received current into a voltage and amplify a voltage level. An output voltage of the amplifier 111 may be provided to the first comparator 112 and the second comparator 113.

The first comparator 112 may compare an output voltage Vout of the amplifier 111 with an on-threshold voltage TH1, and generate an on signal E_ON based on a comparison result. The second comparator 113 may compare an output voltage Vout of the amplifier 111 with an off-threshold voltage TH2, and generate an off signal E_OFF based on a comparison result. The first comparator 112 and the second comparator 113 may generate an on signal E_ON or an off signal E_OFF when a variation amount of light received by the photoelectric conversion device PD is equal to or greater than a certain level of variation.

For example, the on signal E_ON may be at a high level when a light amount received by the photoelectric conversion device PD increases to a certain level or more, and the off signal E_OFF may be at a high level when a light amount received by the photoelectric conversion device PD is reduced to a certain level or less. The on-event holder 114 and the off-event holder 115 may respectively hold the on signal E_ON and the off signal E_OFF and then output the same. When the pixel PX is scanned, the on signal E_ON and the off signal E_OFF may be output. As described above, when light sensitivity is adjusted, levels of the on-threshold voltage TH1 and the off-threshold voltage TH2 may be modified. For example, the light sensitivity may be reduced. Accordingly, the level of the on-threshold voltage TH1 may be increased, and the level of the off-threshold voltage TH2 may be reduced. Accordingly, when a variation in light received by the photoelectric conversion device PD is greater than before the levels of the on-threshold voltage TH1 and the off-threshold voltage TH2 are modified, the first comparator 112 and the second comparator 113 may generate the on signal E_ON or the off signal E_OFF.

Figure 7A:
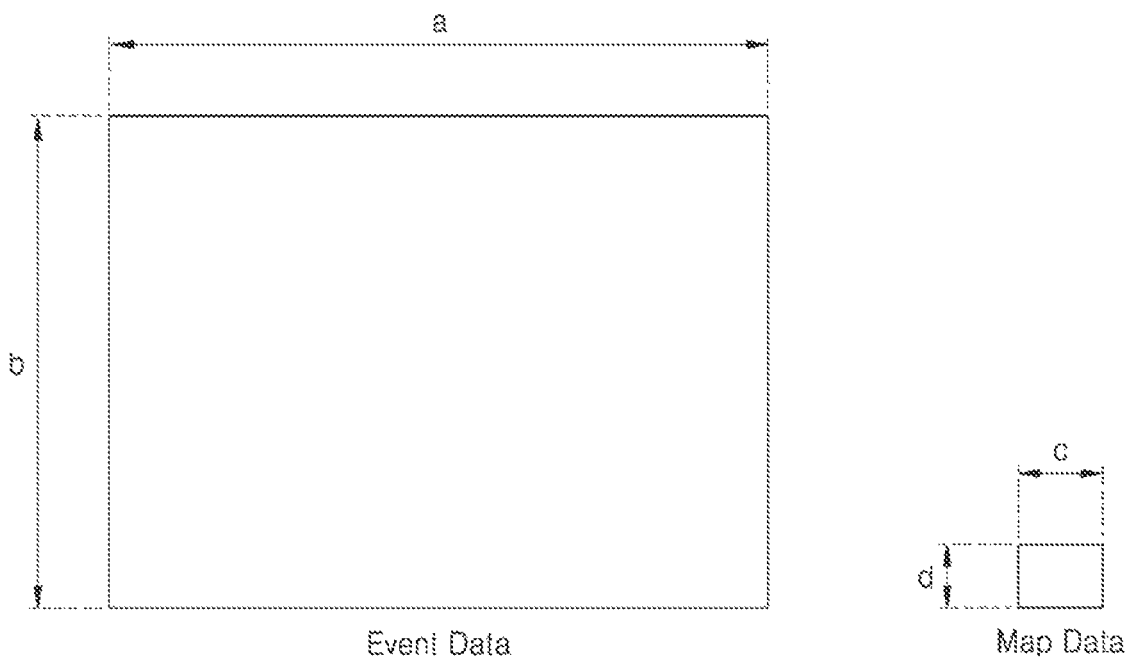
FIGS. 7A and 7B are diagrams illustrating a method of transmitting, by a vision sensor according to an example embodiment, data via an interface circuit.
Figure 7B:
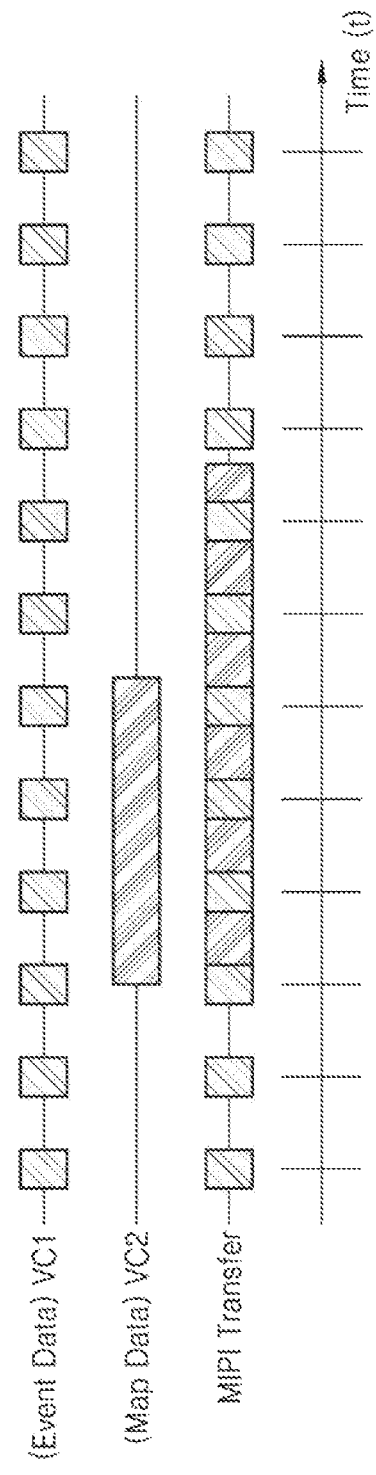

FIGS. 7A and 7B are diagrams illustrating a method of transmitting, by a vision sensor according to an example embodiment, data via an interface circuit.

Referring to FIG. 7A, event data may be generated based on an event signal EVS generated based on, for example, 2 bits/pixel and 1000 fps, and a pixel array size (a×b). A packet including at least one event signal EVS may be output from the interface circuit 140 as event data. A packet may include a timestamp, a column address, a row address, and polarity information of an event signal, and an arrangement order thereof is not limited. A header indicating a start of a packet may be added to a front end of the packet, and a tail indicating an end of the packet may be added to a back end of the packet. A packet may include at least one event signal.

A timestamp may include information about a time when an event has occurred. For example, a timestamp may include 32 bits, but is not limited thereto.

A column address and a row address may each include a plurality of bits, for example, 8 bits. In this case, a vision sensor including a plurality of pixels arranged in up to eight rows and up to eight columns may be supported. However, this is an example, and the number of bits of a column address and a row address may vary according to the number of pixels.

Polarity information may include information about an on-event and an off-event. For example, the polarity information may include 1 bit including information about whether an on-event has occurred and 1 bit including information about whether an off-event has occurred. For example, a bit indicating an on-event and a bit indicating an off-event may not be both '1' but may be both '0.'

The map data MDT includes more information in each frame than the event signal EVS, and thus, a size and generation period of the map data MDT may be adjusted according to a user's settings. For example, the map data MDT may be generated based on 16 bits/pixel and 50 fps. A size (c×d) of the map data MDT may be adjusted by cropping and event binning setting.

Referring to FIG. 7B, according to an example embodiment, the interface circuit 140 may be implemented as an MIPI interface, and for example, a D-PHY interface, which is an interface between a camera and a display, may be used. Here, by using a plurality of virtual channels VC, the map data MDT may be transmitted simultaneously with periodically transmitting the event data EDT. For example, as illustrated in FIG. 7B, while periodically transmitting event data EDT via a first virtual channel VC1, the map data MDT may be transmitted via a second virtual channel VC2. By appropriately setting a size and transmission period of the map data MDT, the map data MDT may also be additionally transmitted without affecting transmission of the event data EDT.

Figure 8A:
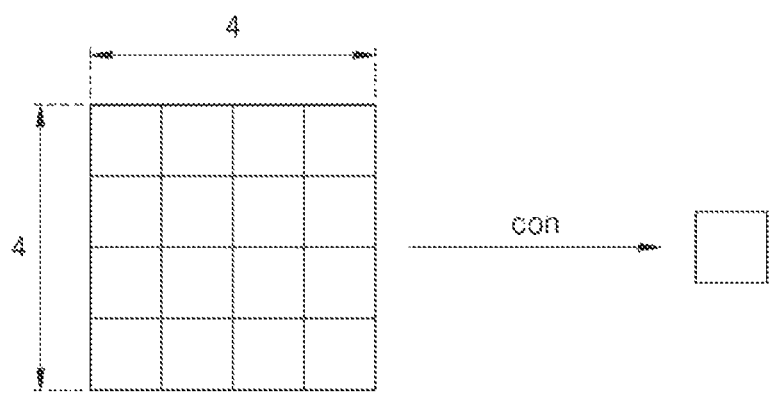
FIGS. 8A, 8B, and 8C are diagrams illustrating event binning of a vision sensor according to an example embodiment.
Figure 8B:
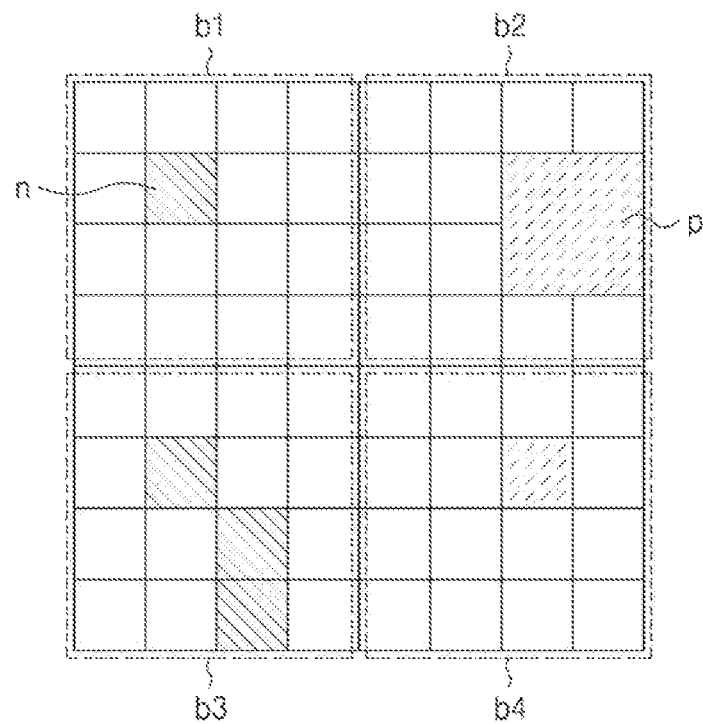
Figure 8C:
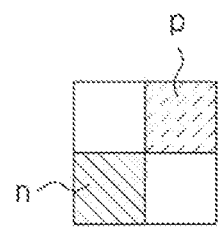

FIGS. 8A through 8C are diagrams illustrating event binning of a vision sensor according to an example embodiment.

Binning refers to a data preprocessing technique of dividing raw data into smaller sections (bins) and replacing a value of the sections with a median value or the like. In the present disclosure, according to event binning, an event is determined to have occurred when the number of event signals generated on a pixel array of a preset N×N size is greater than a threshold. Referring to FIG. 8A, each 4×4 size period of a pixel array may be set as a binning region, and when two or more events have occurred in a binning region (con), it is determined that an event has occurred in that binning region.

Referring to FIG. 8B, events that have occurred in a pixel array of an 8×8 size are shown. n denotes pixels in which an off-event has occurred, and p denotes pixels in which an on-event has occurred. For example, it may be determined that an off-event has occurred in a pixel in a first binning region b1, and an on-event has occurred in four pixels in a second binning region b2, and an off-event has occurred in three pixels of a third binning region b3, and one on-event has occurred in a pixel in a fourth binning region b4.

Referring to FIG. 8C, data obtained after applying event binning may include information indicating that no event has occurred in the first binning region b1, and an on-event has occurred in the second binning region b2, and an off-event has occurred in the third binning region b3, and no event has occurred in the fourth binning region b4. By applying event binning in a 4×4 size, to an event signal generated in a pixel array of an 8×8 size, data of a 2×2 size may be obtained.

FIG. 9 is a diagram for describing a method of generating a plurality of timestamp maps by using a vision sensor according to an example embodiment.

When the vision sensor 100 generates a timestamp map TSM, the number of event signal frames or a time period may be set. Referring to FIG. 9, timestamp map data is generated for every twelve event signal frames. An event signal here may be in an AER format.

The vision sensor 100 may generate a plurality of timestamp maps TSM, for example, first through third timestamp maps. In this case, periods of frames for generating the first through third timestamp maps may overlap each other. The plurality of timestamp maps TSM may be generated based on identical event signal frames, but may differ in a timestamp reference, which is a reference time point of a timestamp map generation period.

For example, when generating three timestamp maps TSM, a first timestamp map may be generated by generating timestamp map data 1 TSM1 by accumulating from an nth event signal frame to a (n+11)th event signal frame included in a first map accumulate time window (Map 1 accumulate time window), a total of twelve event signal frames, with respect to a first timestamp reference frame TSR1. A second timestamp map may be generated by generating timestamp map data 2 TSM2 by accumulating a total of twelve event signal frames, from an (n+4)th event signal frame included in a second map accumulate time window (Map 2 accumulate time window), with respect to a second timestamp reference frame TSR2. A third timestamp map may be generated by generating timestamp map data 3 TSM3 by accumulating a total of twelve event signal frames, from an (n+8)th event signal frame included in a third map accumulate time window (Map 3 accumulate time window), with respect to a third timestamp reference frame TSR3. In the timestamp maps, a timestamp reference used as a reference differs, but event signal frames used in generating the timestamp maps may overlap each other.

Figure 10:
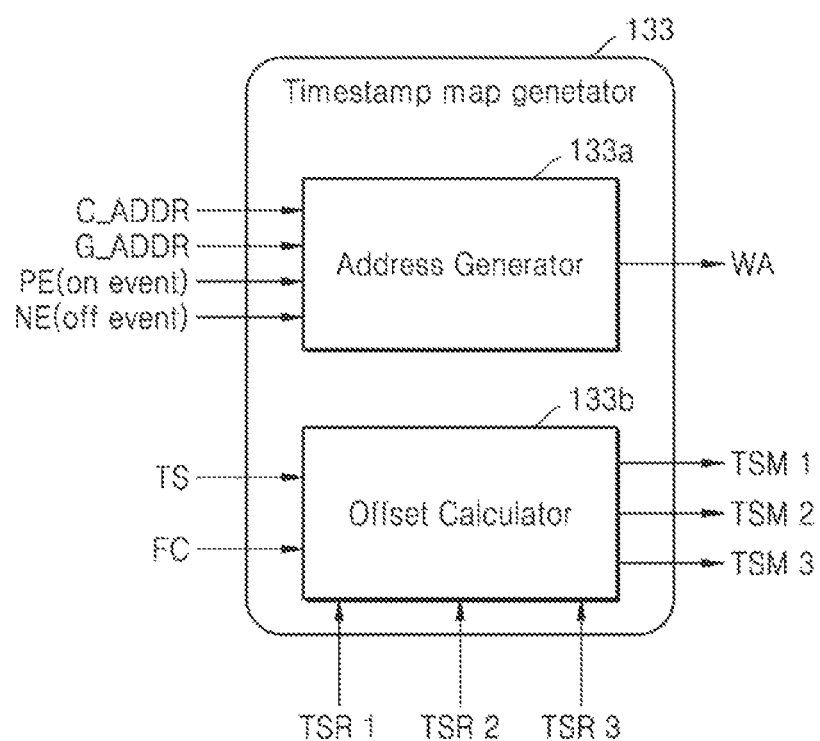
FIG. 10 is a diagram for describing a timestamp map generator in a vision sensor according to an example embodiment.

FIG. 10 is a diagram for describing a timestamp map generator in a vision sensor according to an example embodiment.

Referring to FIG. 10, the timestamp map generator 133 may include an address generator 133a and an offset calculator 133b. When an event is sensed in the pixel array 110 and an event signal EVS is generated, the address generator 133a may determine an address WA to which information including the event signal EVS and the timestamp TS is to be recorded on a timestamp map TSM, based on a column address C_ADDR, a group address G_ADDR, an on-event PE, and/or an off-event NE. The offset calculator 133b generates the timestamp map TSM by using a frame counter FC indicating an order in which the timestamp TS and an event signal frame have occurred and a timestamp reference TSR. An operation of the offset calculator 133b will be described in detail with reference to FIG. 11.

Figure 11:
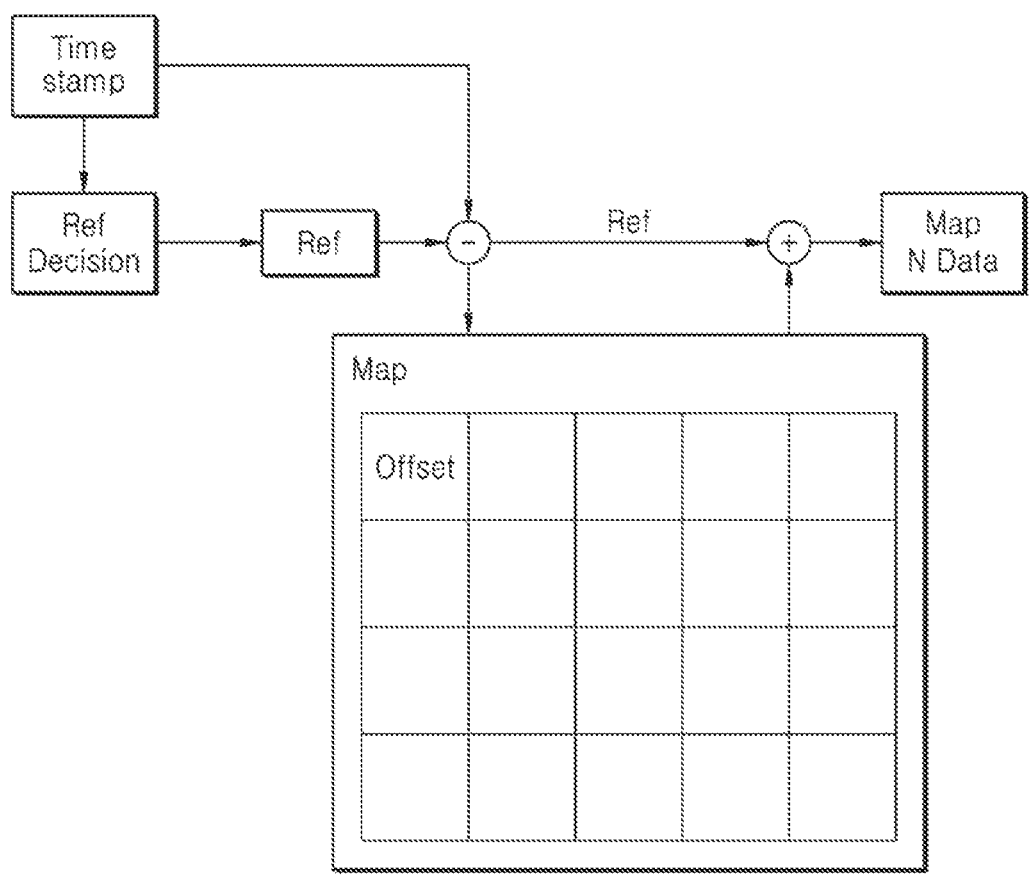
FIG. 11 is a diagram for describing a method of reducing, by a vision sensor according to an example embodiment, data of a timestamp map.

FIG. 11 is a diagram for describing a method of reducing, by a vision sensor according to an example embodiment, data of a timestamp map.

Referring to FIGS. 10 and 11, the offset calculator 133b may generate a timestamp map TSM including offset values, which are difference values between a reference time Ref and a timestamp. For example, when the reference time Ref is set, only an offset value from the reference time Ref with respect to a generated event signal EVS is stored in a timestamp map, and later when transmitting timestamp map data, the reference time Ref may be added to the offset value to be transmitted. Accordingly, the storage efficiency of the map data buffer 135, which is a limited storage space, may be improved. The offset calculator 133b may set the reference time Ref based on information about generation of the event signal EVS.

Figure 12:
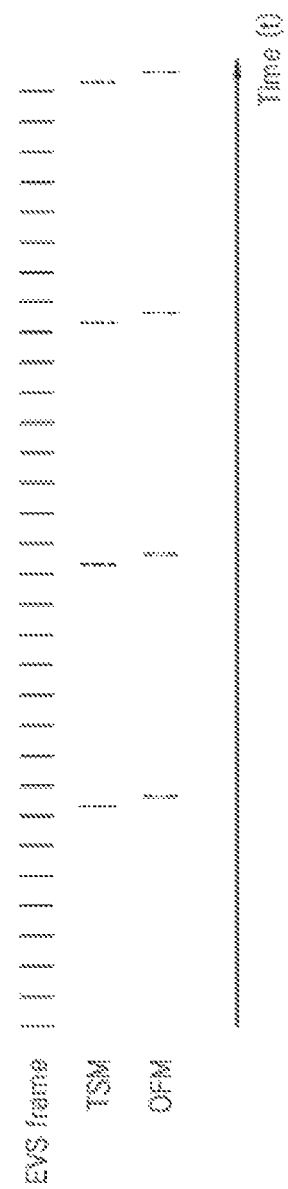
FIG. 12 is a diagram for describing a time when a timestamp map is generated and a time when an optical flow map is generated in a vision sensor according to an example embodiment.

FIG. 12 is a diagram for describing a time when a timestamp map is generated and a time when an optical flow map is generated in a vision sensor according to an example embodiment.

When a map generation period is set, a timestamp map or an optical flow map may be generated for each of event signal frames of a preset number. For example, referring to FIG. 12, a timestamp map may be generated immediately after eight event signal frames are generated, and an optical flow map may be generated based on the timestamp map after generating the timestamp map. For example, the optical flow map may be generated immediately after generating the timestamp map before the ninth signal frame is generated. The timestamp map and the optical flow map may be periodically generated each time when every eight event signal frames are generated. An event signal here may be in an AER format.

Figure 13A:
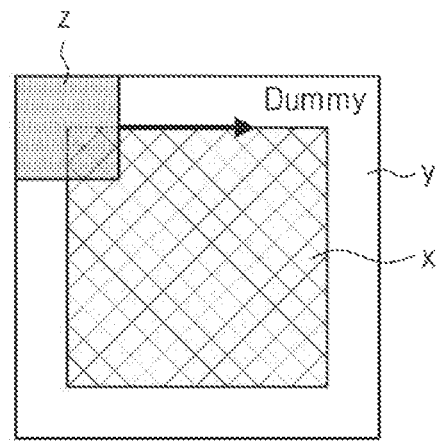
FIGS. 13A and 13B are diagrams for describing generation of an optical flow map in a vision sensor according to an example embodiment.
Figure 13B:
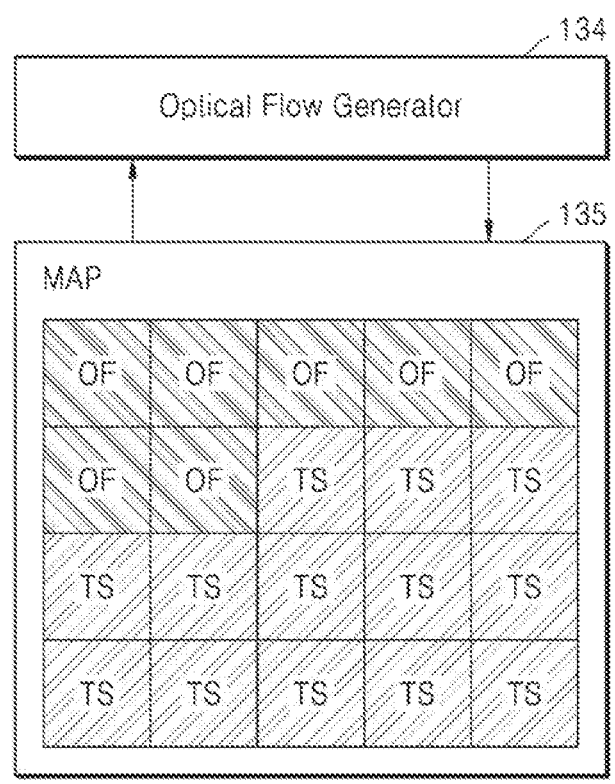

FIGS. 13A and 13B are diagrams for describing generation of an optical flow map in a vision sensor according to an example embodiment.

For example, to generate an optical flow map, a 5×5 size digital filter (z) having an appropriate filter coefficient with respect to a timestamp map (x) may be used. Referring to FIG. 13A, dummy data (y) may be located at an edge of the timestamp map (x) to apply the digital filter (z). A user may set a digital filter coefficient by considering a relationship between a kernel size and a filter coefficient. Various forms of filters may calculate an optical flow OF. However, example embodiments are not limited thereto. For example, various algorithms other than a method of applying a filter may be used.

When the timestamp map TSM is completed, an optical flow with respect to the timestamp map TSM may be calculated. Referring to FIG. 13B, the optical flow map OFM may be calculated and stored in a storage location of the timestamp map TSM. For example, when a timestamp map TSM is generated with respect to certain data on which crop or binning is performed, and the timestamp map TSM is stored at a particular location of a map data buffer, the optical flow map OFM may be stored in that particular location, instead of the timestamp map TSM. A size of a memory, for example, synchronous static random access memory (SRAM), in the map data buffer 135 may be more effectively managed in this manner.

Figure 14:
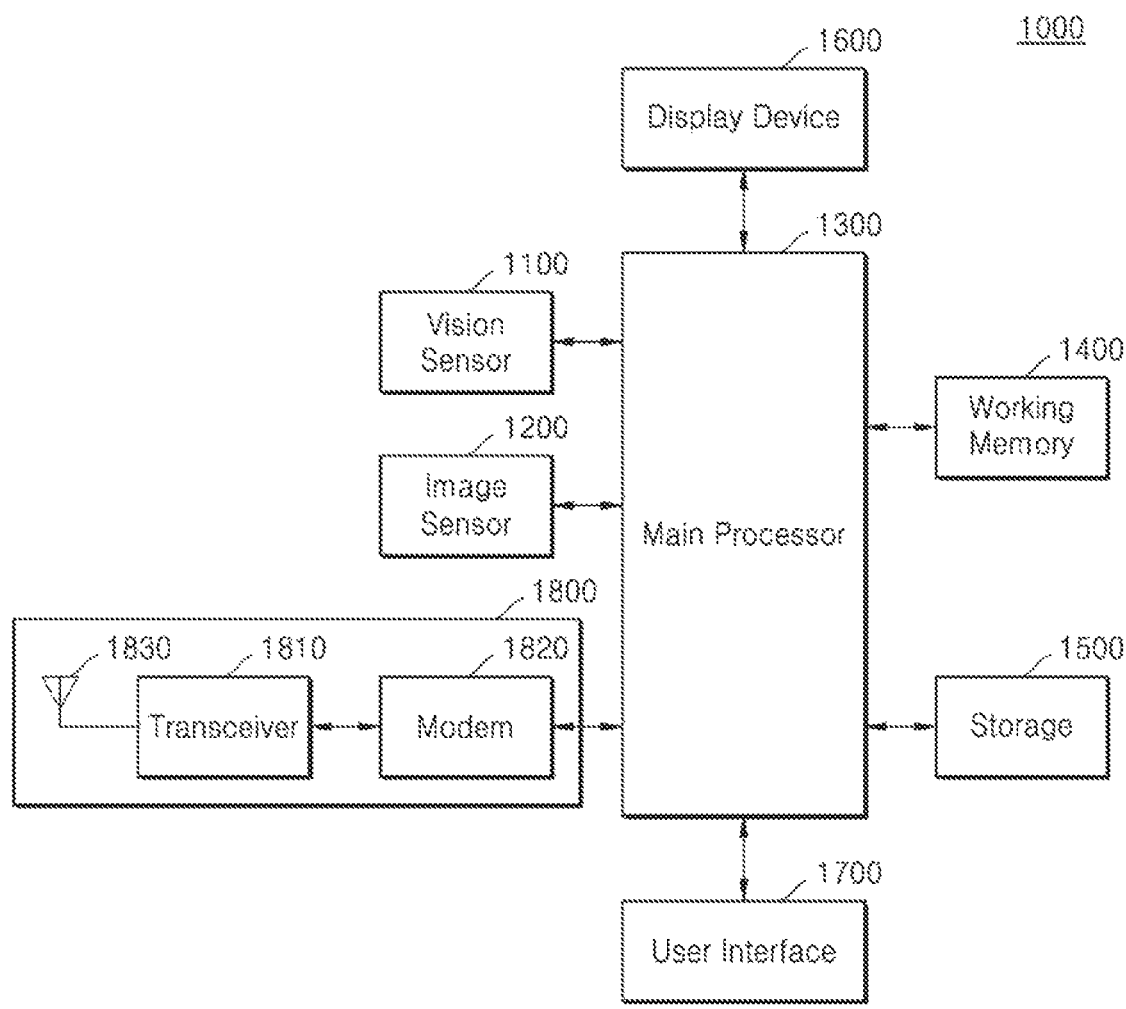
FIG. 14 is a block diagram illustrating an example of an electronic device to which a vision sensor according to an example embodiment is applied.

FIG. 14 is a block diagram illustrating an example of an electronic device to which a vision sensor according to an example embodiment is applied.

Referring to FIG. 14, an electronic device 1000 may include a vision sensor 1100, an image sensor 1200, a main processor 1300, a working memory 1400, a storage 1500, a display device 1600, a user interface 1700, and a communicator 1800.

The vision sensor 100 described with reference to FIGS. 1 through 13 may be applied as the vision sensor 1100. The vision sensor 1100 may sense an object to generate event signals, and generate a timestamp map (e.g., TSM in FIG. 1) or an optical flow map (e.g., OFM in FIG. 1), based on the generated event signals, and transmit data of at least one of an event signal (e.g., EVS of FIG. 2), a timestamp map TSM, or an optical flow map OFM to the main processor 1300.

The image sensor 1200 may generate image data, such as raw image data, based on a received optical signal and provide the image data to the main processor 1300.

The main processor 1300 may control the overall operation of the electronic device 1000, and may detect a movement of an object by processing event data, that is, event signals received from the vision sensor 1100. Also, an image frame may be received from the image sensor 1200 and image processing may be performed based on preset information. Similar to the processor 200 shown in FIG. 1, the main processor 1300 may include an application specific integrated circuit (ASIC), a field-programmable gate array (FPGA), a dedicated microprocessor, a microprocessor, a general purpose processor, or the like. According to an example embodiment, the main processor 1300 may include an application processor or an image processor.

The working memory 1400 may store data used for an operation of the electronic device 1000. For example, the working memory 1400 may temporarily store packets or frames processed by the main processor 1300. For example, the working memory 1400 may include a volatile memory such as dynamic random access memory (DRAM) and SRAM, and/or a non-volatile memory such as phase-change RAM (PRAM), magneto-resistive RAM (MRAM), resistive RAM (ReRAM), and ferro-electric RAM (FRAM).

The storage 1500 may store data, of which storage is requested from the main processor 1300 or other components. The storage 1500 may include a non-volatile memory such as flash memory, PRAM, MRAM, ReRAM, and FRAM.

The display device 1600 may include a display panel, a display driving circuit, and a display serial interface (DSI). For example, the display panel may be implemented as various devices such as a liquid crystal display (LCD) device, a light-emitting diode (LED) display, an organic LED (OLED) display, and an active matrix OLED (AMO-LED) display. The display driving circuit may include a timing controller, a source driver, and the like, needed to drive a display panel. A DSI host embedded in the main processor 1300 may perform serial communication with the display panel through the DSI.

The user interface 1700 may include at least one of input interfaces such as a keyboard, a mouse, a keypad, a button, a touch panel, a touch screen, a touch pad, a touch ball, a gyroscope sensor, a vibration sensor, and an acceleration sensor.

The communicator 1800 may exchange signals with an external device/system through an antenna 1830. A transceiver 1810 and a modulator/demodulator (MODEM) 1820 of the communicator 1800 may process signals exchanged with external devices/systems according to wireless communication protocols such as Long Term Evolution (LTE), Worldwide Interoperability for Microwave Access (WIMAX), Global System for Mobile communication (GSM), Code Division Multiple Access (CDMA), Bluetooth, Near Field Communication (NFC), Wireless Fidelity (Wi-Fi), or Radio Frequency Identification (RFID).

Components of the electronic device 1000, for example, the vision sensor 1100, the image sensor 1200, the main processor 1300, the working memory 1400, the storage 1500, the display device 1600, the user interface 1700, and the communicator 1800, may exchange data according to at least one of various interface protocols such as Universal Serial Bus (USB), Small Computer System Interface (SCSI), MIPI, Inter-Integrated Circuit (I2C), Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), or Universal Flash Storage (UFS).

At least one of the components, elements, modules or units (collectively "units" in this paragraph) represented by a block in the drawings including FIGS. 3 and 4A may be embodied as various numbers of hardware, software and/or firmware structures that execute respective functions described above, according to an exemplary embodiment. For example, at least one of these units may use a direct circuit structure, such as a memory, a processor, a logic circuit, a look-up table, etc. that may execute the respective functions through controls of one or more microprocessors or other control apparatuses. Also, at least one of these units may be specifically embodied by a module, a program, or a part of code, which contains one or more executable instructions for performing specified logic functions, and executed by one or more microprocessors or other control apparatuses. Further, at least one of these units may include or may be implemented by a processor such as a central processing unit (CPU) that performs the respective functions, a microprocessor, or the like. Two or more of these units may be combined into one single unit which performs all operations or functions of the combined two or more units. Also, at least part of functions of at least one of these units may be performed by another of these units. Further, although a bus is not illustrated in the above block diagrams, communication between the units may be performed through the bus. Functional aspects of the above exemplary embodiments may be implemented in algorithms that execute on one or more processors. Furthermore, the units represented by a block or processing steps may employ any number of related art techniques for electronics configuration, signal processing and/or control, data processing and the like.

While example embodiments have been illustrated and described above, it will be apparent to those skilled in the art that modifications and variations could be made without departing from the scope as defined by the appended claims and their equivalents.

What is claimed is:

1. A sensor comprising:
   a pixel array comprising a plurality of pixels disposed in a matrix form;
   a data buffer;
   an optical flow map generator configured to generate a first optical flow map based on an optical flow representing a pattern of motion of an object and a timestamp map stored in the data buffer, the optical flow map generator being configured to store the first optical flow map in the data buffer; and
   an interface circuit configured to receive the first optical flow map stored in the data buffer and transmit the first optical flow map to an external processor implemented as a separate semiconductor chip from the sensor,
   wherein the optical flow is generated from the plurality of pixels based on a movement of the object, and
   wherein the optical flow map generator and the interface circuit are implemented in the sensor.

2. The sensor of claim 1, wherein the interface circuit is configured to transmit the first optical flow map periodically to the external processor.

3. The sensor of claim 1, wherein the sensor is configured to adjust a size of the first optical flow map and transmit the first optical flow map to the external processor.

4. The sensor of claim 2, wherein the interface circuit is configured to receive a second optical flow map generated for each of a plurality of event signal frames of a preset number from the optical flow map generator generated based on pixels corresponding to plurality of regions of interest and transmit the second optical flow map to the external processor.

5. The sensor of claim 2, wherein the interface circuit is configured to receive a second optical flow map generated for each of a plurality of event signal frames of a preset number from the optical flow map generator generated based on pixels corresponding to a region of interest and transmit the second optical flow map to the external processor.

6. The sensor of claim 5, wherein the second optical flow map includes information about a movement direction of the object.

7. The sensor of claim 6, wherein the interface circuit is configured to transmit the first optical flow map to the external processor in a first mode, and
   wherein the interface circuit is configured not to transmit the first optical flow map to the external processor in a second mode different from the first mode.

8. The sensor of claim 7, wherein the first optical flow map includes information about velocity of the object.

9. The sensor of claim 1, wherein the optical flow map generator is configured to store the first optical flow map in the data buffer instead of the timestamp map.

10. A sensor comprising:
    a pixel array comprising a plurality of pixels disposed in a matrix form;
    a data buffer;
    an optical flow map generator configured to generate a first optical flow map based on an optical flow representing a pattern of motion of an object and a timestamp map stored in the data buffer, the optical flow map generator being configured to store the first optical flow map in the data buffer; and
    an interface circuit configured to receive the first optical flow map stored in the data buffer and transmit the first optical flow map to an external processor implemented as a separate semiconductor chip from the sensor,
    wherein the optical flow is generated from the plurality of pixels based on a movement of the sensor, and
    wherein the optical flow map generator and the interface circuit are implemented in the sensor.

11. The sensor of claim 10, wherein the sensor is configured to adjust a size of the first optical flow map and transmit the first optical flow map to the external processor.

12. The sensor of claim 10, wherein the interface circuit is configured to transmit the first optical flow map periodically to the external processor.

13. The sensor of claim 12, wherein the interface circuit is configured to receive a second optical flow map generated for each of a plurality of event signal frames of a preset number from the optical flow map generator generated based on pixels corresponding to a region of interest and transmit the second optical flow map to the external processor.

14. The sensor of claim 13, wherein the interface circuit is configured to receive a third optical flow map generated for each of the plurality of event signal frames of the preset number from the optical flow map generator generated based on pixels corresponding to plurality of regions of interest and transmit the second optical flow map to the external processor.

15. The sensor of claim 14, wherein the interface circuit is configured to transmit the second optical flow map to the external processor in a first mode, and
wherein the interface circuit is configured not to transmit the second optical flow map to the external processor in a second mode different from the first mode.

16. The sensor of claim 15, wherein the first optical flow map includes information about velocity of the object.

17. The sensor of claim 10, wherein the optical flow map generator is configured to store the first optical flow map in the data buffer instead of the timestamp map.

18. A sensor comprising:
a pixel array comprising a plurality of pixels disposed in a matrix form;
a data buffer;
an optical flow map generator configured to generate a first optical flow map based on an optical flow representing a pattern of motion of an object and a timestamp map stored in the data buffer, the optical flow map generator being configured to store the first optical flow map in the data buffer; and
an interface circuit configured to receive the first optical flow map stored in the data buffer and transmit the first optical flow map to an external processor implemented as a separate semiconductor chip from the sensor,
wherein the optical flow is generated from the plurality of pixels based on a relative motion between an observer and a scene, and
wherein the optical flow map generator and the interface circuit are implemented in the sensor.

19. The sensor of claim 18, wherein the interface circuit is configured to transmit the first optical flow map periodically to the external processor, and
wherein the interface circuit is configured to receive a second optical flow map generated for each of a plurality of event signal frames of a preset number from the optical flow map generator generated based on pixels corresponding to a region of interest to the external processor and transmit the second optical flow map to the external processor.

20. The sensor of claim 19, wherein the interface circuit is configured to transmit the first optical flow map to the external processor in a first mode, and
wherein the interface circuit is configured not to transmit the first optical flow map to the external processor in a second mode different from the first mode.

* * * * *